UNITED STATES PATENT OFFICE.

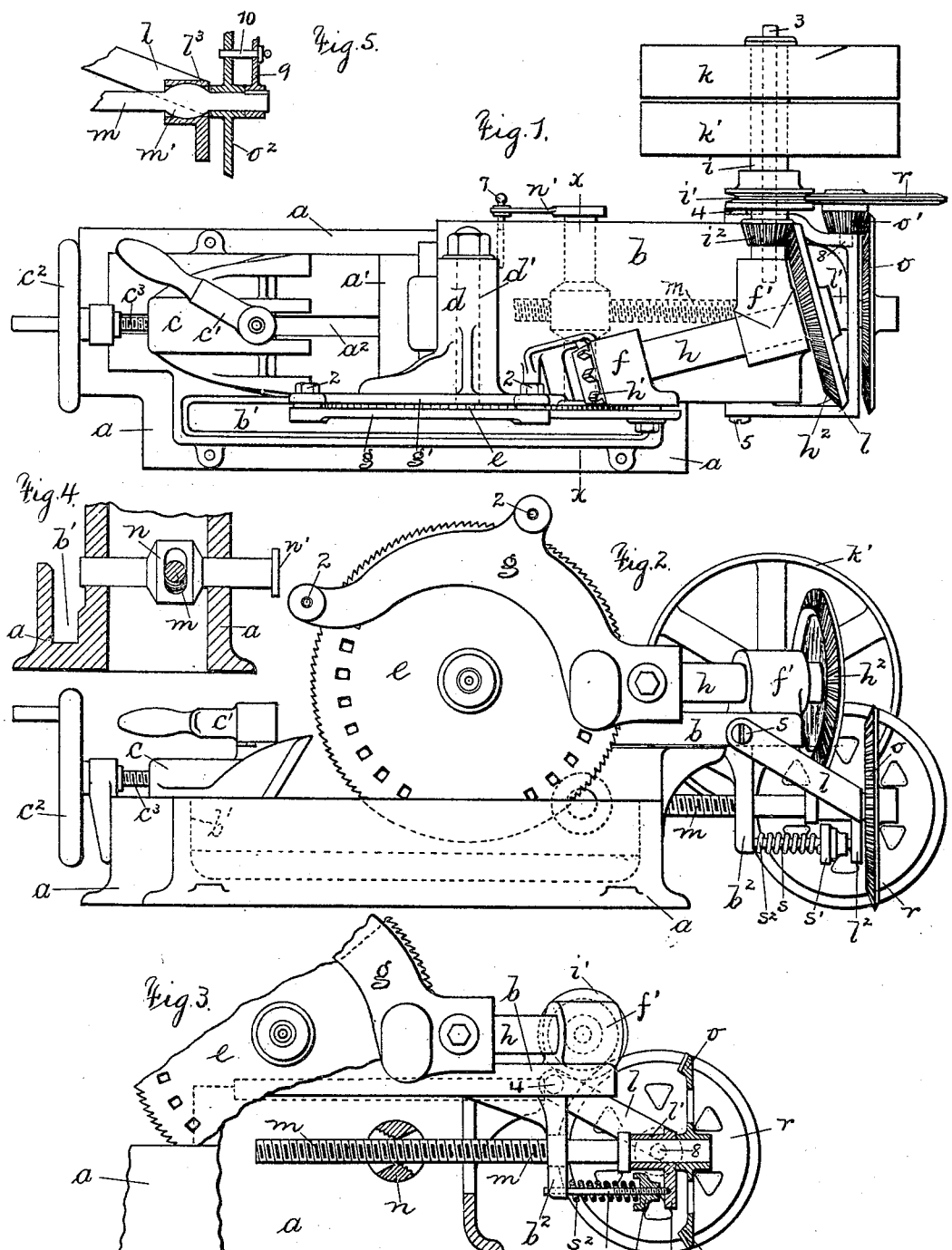

CHARLES A. JUENGST, OF CROTON FALLS, NEW YORK, ASSIGNOR TO HIGLEY MACHINE COMPANY, OF CROTON FALLS, NEW YORK, A CORPORATION OF NEW YORK.

COLD-METAL-SAWING MACHINE.

No. 799,987.     Specification of Letters Patent.     Patented Sept. 19, 1905.

Application filed March 27, 1903. Serial No. 149,868.

*To all whom it may concern:*

Be it known that I, CHARLES A. JUENGST, a citizen of the United States, residing at Croton Falls, in the county of Westchester and State of New York, have invented an Improvement in Machines for Sawing Metal, of which the following is a specification.

My invention relates to a machine for sawing or cutting metals in a cold state; and the objects of my invention are to provide the teeth of the saw with a constant supply of oil and to provide a yielding movement and separation of the operative parts or factors under excess tension or strain.

In my improvement the bed of the machine is provided with an oil-tank into which the saw-blade dips, and the saw in its rotation is thus constantly raising a film of oil on the teeth and adjacent surfaces to the work, and the devices for feeding along the carriage and saw progressively have a yielding relation with a shaft driven by a prime mover, so that the feeding devices slightly separate and are permitted to slip under the tension or strain created, where the saw, because of the hardness of the material, cannot and does not cut as fast as the progressive feed. The effect of this latter condition is to momentarily stop the feed without affecting the revolution of the saw. The saw can thus keep pace with the feed.

In the drawings, Figure 1 is a plan of the devices of my improvement. Fig. 2 is a side elevation of the same. Fig. 3 is a partial side elevation and partial vertical central section at the right-hand end of the structure, Figs. 1 and 2. Fig. 4 is a cross-section at $x\ x$ of Fig. 1 through the bed of the machine, the oil-tank portion through the feed-screw and arbor, and an elevation of the hub structure through which this feed-screw passes; and Fig. 5 is a vertical section and partial elevation through the bracket-bearing of the feed-screw arbor at the right hand of the machine and showing a form of my invention.

The bed $a$ of the machine and the carriage $b$ are of metal of any well-known or desired form, the carriage $b$ and bed $a$ being provided with suitable ways by which the carriage may move over the bed. The details of these parts form no essential part of my invention and have not been shown. Upon the bed at the left-hand end of Figs. 1 and 2 is an adjustable clamp device $c$, between which and the fixed wall $a'$ of the bed the work is placed and held. The clamp device is adapted to slide on the bed and is held by a screw moving in a slot $a^2$ of the bed, the clamping action being effected by the arm $c'$, attached to the upper end of the screw. A hand-wheel $c^2$ is provided on one end of a screw $c^3$ for the purpose of moving the clamp device $c$ longitudinally of the bed $a$ of the machine. The bed is provided with an oil-tank $b'$ along one side with offset walls, Figs. 1 and 4, into which the saw $e$ dips. It is only necessary that a small portion of the periphery of the saw dip into the oil, so as to raise a film of oil on the teeth and adjacent surfaces of the saw up to the work, so as to lubricate the cutting-surfaces to keep the parts cool and facilitate the work. On the carriage $b$ there is a standard $d$, and an arbor $d'$ passes through the standard to support the saw $e$. There are other standards $f\ f'$ on the carriage $b$, and I provide guide-arms $g\ g'$ of curved form in side elevation, Fig. 2, coming at opposite sides of the saw-blade and closely adjacent to the surfaces or sides of the saw. The guide-arm $g'$ is securely fastened to the standard $f$, and it is provided with bolts 2, which pass across over the saw and serve to connect it to the guide-arm $g'$, and by these means the two guide-arms are united and are supported by the guide-arm $g$ upon the standard $f$.

A shaft $h$ passes through the standards $f\ f'$. On one end of this shaft is a sprocket $h'$, the teeth of which engage perforations in the saw for the purpose of driving the same. This driving device is, however, well known in the art. On the opposite end of the shaft $h$ there is a bevel-wheel $h^2$. Projecting from the standard $f'$ is an arbor 3, on which is a sleeve $i$. Mounted on this sleeve $i$ are fast and loose pulleys $k\ k'$ and a grooved friction-wheel $i'$; also, a bevel-pinion $i^2$. A yoke-bracket $l$ is at its ends pivotally connected to the opposite sides of the carriage at one end by pivot-screws 4 5. This yoke-bracket $l$ is provided with a central bearing-sleeve $l'$ for the feed-screw arbor $m$. This feed-screw arbor passes through the bearing-sleeve $l'$, through a depending arm $b^2$ of the carriage $b$, through a slot in one end of the bed of the machine, and through a rocker-hub or feed-nut $n$. The feed-screw arbor $m$ is not threaded where it passes through the bearing-sleeve $l'$ and through the depending arm $b^2$; but said feed-screw arbor $m$ is mainly supported by the said depending arm $b^2$ and the rocker-hub $n$ in view of the fact that the bracket $l$ is pivotally mounted and would be capable of a movement except for the said arm $b^2$ and hub $n$. This rocker-hub $n$ is perforated, and the opposite ends of the perforation are provided with vertically-elongated tapering slots, the form being particularly shown in Fig. 4 in elevation and in Fig. 3 in cross-section. The upper surface of the slot on one side and the lower surface of the slot on the other side are provided with sectional threads adapted with the swinging of the rocker-sleeve to mesh with and conform to the screw-thread of the arbor $m$. In the position of the parts, Fig. 3, it is apparent that the feed-screw arbor $m$ may be drawn freely through the rocker-hub, because it is swung so that the sectional screw-threads therein are out of engagement with the threads of the arbor. This rocker-hub $n$ has bearings in the sides of the bed $a$ of the machine, and it projects from one side of the bed, at which place it is provided with an arm $n'$ and a pin 7. The pin is movable in the free end of the arm and is adapted to pass into holes either in the bed $a$ or in some adjacent fixed part provided therefor, and the function of the arm $n'$ is to turn the rocker-hub $n$ so as to bring the segment-threads of the said rocker-hub into mesh with the threads of the screw-arbor or out of mesh at the pleasure of the operator, the function of the pin 7 being to fix the desired position of the said rocker-hub. On the free and outer end of this feed-screw arbor $m$ there is provided a bevel-gear $o$, and in one side of the bracket there is fixed a short arbor 8, upon which is mounted a bevel-pinion $o'$, meshing with the bevel-wheel $o$. Connected with the bevel-pinion $o'$ is a friction-wheel $r$, the periphery of which preferably conforms to the groove of the friction-wheel $i''$, the friction-wheels $i''$ and $r$ being in mesh.

The bearing-sleeve $l'$ of the bracket $l$ is formed with a depending arm $l^2$, and I provide a screw-threaded rod $s$ at one end passing through the lower end of the depending arm $b^2$ of the carriage and at its other end passing into a recess in the arm $l^2$ of the bearing-sleeve. Around this rod $s$ at one end there is a nut $s'$, and between the nut and the arm $b^2$ of the carriage is a spring $s^2$. In Fig. 3 the bearing-sleeve $l'$ is shown with parallel sides and the bevel-gear $o$ is preferably fixed to the end of the feed-screw arbor $m$; but in the form of my invention shown in Fig. 5 the feed-screw arbor $m$ is provided with a swelled portion having a curved surface $m'$ and the bearing-sleeve $l^3$ instead of having parallel inner surfaces for this arbor is provided with slightly-curved faces for the swelled or curved portion $m'$ of the arbor. In this form of my invention the bevel-gear $o^2$ is loose upon the arbor, and I provide an arm 9, having a hub fixed on the end of the arbor $m$. This arm 9 is provided with a finger 10, passing through the end of the same and into a recess or aperture in the loose bevel-gear $o^2$. By the construction in this form of my invention the fixed arm 9 and finger 10 compel the loose bevel-gear $o^2$ to turn with it and the arbor $m$.

In the operation of the machine power is applied to the fast pulley $k$, from thence to the sleeve $i$, grooved friction-wheel $i'$, bevel-pinion $i^2$, from the bevel-pinion $i^2$ by the bevel-wheel $h^2$, shaft $h$, sprocket $h'$ to the saw to rotate the same, from the grooved friction-wheel $i''$ to the friction-wheel $r$ and bevel-pinion $o'$, therefrom to the bevel-wheel $o$, feed-screw arbor $m$, which acting in the rocker-hub $n$ in its rotation draws the carriage $b$ and parts connected therewith along and forces the saw into and through the work. In this operation, and as hereinbefore stated, the saw-blade takes up from the oil-tank a film of oil upon the teeth and adjacent surfaces thereof to the work to keep the parts cool and facilitate the cutting. The contact of the wheels $i''$ and $r$ is that of friction only. Consequently the effect of the slightest separation of the surfaces which are pressed into contact will be to stop the movement of the gear $o$ and arbor $m$ and arrest the forward movement of the feed. The function of the screw-threaded rod $s$ as between the depending arm $b^2$ of the carriage and the arm $l^2$ of the swinging bracket is to keep the swinging bracket in as much of an elevated position as possible in view of the rigidity of the feed-screw arbor $m$. The swinging bracket $l$, upon which the bevel-pinion $o'$ and friction-wheel $r$ are mounted, provides for a yielding of the friction-wheel $r$ with reference to the grooved friction-wheel $i''$ when it happens that excess tension or strain is created because of the hardness of the material through which the saw is passing retarding the progress of the cut while the feed of the saw is moving at a maximum speed. Under these conditions the retarding movement of the saw and its carriage and the effort at a forward movement of the feed-screw arbor $m$ causes a slight bend in the parts by virtue of the inclined relation of the bracket $l$ to the arbor $m$, which has the effect under strain and tension of slightly separating the periphery of the friction-wheel $r$ from contact with the groove of the friction-wheel $i''$, consequently stopping even for a moment or more the feed of the screw-arbor $m$, but not in any respect affecting or stopping the rotation of the saw by the parts provided therefor. The saw thus has an opportunity to cut through the harder material without being forced ahead by the feed, and time is provided in this manner for cutting through the harder material before a necessary forward movement is imparted to the feed devices. This movement is effected to a greater or less extent, as according to the circumstances there may be an actual and apparent separation of the surfaces of the friction-wheels $r$ and $i'$ or only sufficient of a separation for the one to slip with reference to the other to produce the same effect for a shorter period.

I claim as my invention—

1. In a metal-sawing machine, the combination with a bed, a carriage and a saw, of devices supported by the carriage, movable therewith and actuated by a prime mover for revolving the saw, other devices supported by the carriage and bed respectively for progressively feeding along the saw, and intermediate devices also supported by the carriage and capable of a slight yielding movement which normally communicate the power of the prime mover to the feeding devices, but which yield under excessive tension and strain to check the feed.

2. In a metal-sawing machine, the combination with a bed, a carriage, and a saw, of devices supported by the carriage, movable therewith and actuated by a prime mover for revolving the saw, other devices supported by the carriage and bed respectively for progressively feeding along the saw, intermediate devices also supported by the carriage and capable of a slight yielding movement which normally communicate the power of the prime mover to the feeding devices, but which yield under excess tension and strain to check the feed, and regulatable spring devices for normally maintaining said intermediate devices in an initial relation of contact.

3. In a metal-sawing machine, the combination with a bed, a carriage and a saw, of driving devices supported by the carriage, movable therewith, and actuated by a prime mover for revolving the saw, a feed-screw arbor, an arm depending from the carriage, a socket-hub actuated manually for engaging and disengaging the feed-screw arbor, a bracket pivotally connected to said carriage, a bearing in said bracket for said feed-screw arbor, gears and a friction-wheel carried by said bracket, and a friction-wheel on the power-shaft and with which the said friction-wheel engages.

4. In a metal-sawing machine, the combination with a bed, a carriage and a saw, of devices supported by the carriage, movable therewith and actuated by a prime mover for revolving the saw, a feed-screw arbor, a depending arm of the carriage through which the same passes and by which it is partially supported, a feed-nut in the bed of the machine, a bearing-sleeve for the said arbor near its end, an inclined bracket-support extending from the bearing and pivotally connected to the carriage so that the line of the bracket is at an acute angle to the line of the arbor, and gear and friction wheel devices extending respectively from the power-shaft to the said arbor for communicating the power of the prime mover to the feeding devices and at the same time providing for a yielding movement under excessive tension and strain.

5. In a metal-sawing machine, the combination with a bed, a carriage, and a saw, of devices supported by the carriage movable therewith and actuated by a prime mover for revolving the saw, a feed-screw arbor, a depending arm of the carriage through which the same passes and by which it is partially supported, a feed-nut in the bed of the machine, a bearing-sleeve for the said arbor near its end, an inclined bracket-support extending from the bearing and pivotally connected to the carriage so that the line of the bracket is at an acute angle to the line of the arbor, an arbor secured to the said swinging bracket, a bevel-pinion and a friction-wheel mounted on said arbor, a bevel-gear on the shaft of the feed-screw arbor meshing with said bevel-pinion, and a friction-wheel on the power shaft or device meshing with the aforesaid friction-wheel for communicating the power of the prime mover to the feeding devices.

6. In a metal-sawing machine, the combination with a bed, a carriage and a saw, of devices supported by the carriage, movable therewith and actuated by a prime mover for revolving the saw, a feed-screw arbor, a depending arm of the carriage through which the same passes and by which it is partially supported, a feed-nut in the bed of the machine, a bearing-sleeve for the said arbor near its end, an inclined bracket-support extending from the bearing and pivotally connected to the carriage, so that the line of the bracket is at an acute angle to the line of the arbor, a depending arm for the sleeve of the bracket, a screw-rod bearing against this arm at one end and at the other end passing through the depending arm of the carriage, a nut on said screw-rod and a helical spring surrounding the screw-rod between the nut and the lower end of the arm of the carriage for applying supporting tension to the parts so as to insure the contact of the friction-wheel which communicates the power of the prime mover to the feeding devices.

7. In a metal-sawing machine, the combination with a bed, a carriage, a saw, and devices for revolving the saw, of a depending arm of the carriage, a sleeve, a depending arm of the sleeve, and a bracket of yoke form connected to the sleeve and the free ends of which are pivotally connected to the carriage, the bracket and its sleeve being adapted to swing, a feed-screw arbor passing through said sleeve and through the depending arm of the carriage, a feed-nut through which said feed-screw arbor passes and by which it is engaged and disengaged manually, adjustable spring function devices located between the depending arm of the sleeve and the depending arm of the carriage, the office of which is to hold up the said sleeve and bracket to a regulatable extent, and means for imparting a rotary movement to the said feed-screw arbor.

8. In a metal-sawing machine, the combination with a bed, a carriage, a saw, and devices for revolving the saw, of a depending arm of the carriage, a sleeve, a depending arm of the sleeve and a bracket of yoke form connected to the sleeve, and the free ends of which are pivotally connected to the carriage, the bracket and its sleeve being adapted to swing, a feed-screw arbor passing through said sleeve and through the depending arm of the carriage, a feed-nut through which said feed-screw arbor passes and by which it is engaged and disengaged manually, a screw-threaded rod s at one end bearing in a recess of the depending arm of the sleeve and at the other end passing through an aperture in the depending arm of the carriage, a nut on said screw-rod, and a helical spring surrounding the same between the nut and the depending arm of the carriage, a bevel-gear secured to the said arbor outside of the said sleeve, a bevel-pinion meshing therewith, a friction-wheel connected to the bevel-pinion and a second friction-wheel engaging the aforesaid friction-wheel, the latter secured to the power-shaft, substantially as set forth.

9. In a metal-sawing machine, the combination with a bed, a carriage and a saw, of standards upon the carriage, a shaft passing through the same, a sprocket on one end of the shaft, the teeth of which engage apertures in the saw, a bevel-wheel on the other end of said shaft, an arbor secured to one of said standards and extending out therefrom at right angles to the bed and carriage and at an obtuse angle to the aforesaid shaft, a sleeve surrounding said arbor, fast and loose pulleys upon said sleeve, a friction-wheel and a bevel-pinion also upon said shaft, the bevel-pinion meshing with the aforesaid bevel-wheel, said devices serving for revolving the saw, and means substantially as herein shown and described and also supported by the carriage and actuated by the friction-wheel upon said sleeve for progressively feeding along the said carriage and saw, substantially as set forth.

10. In a metal-sawing machine, the combination with a bed, a carriage and a saw, of standards upon the carriage, a shaft passing through the same, a sprocket on one end of the shaft the teeth of which engage apertures in the saw, a bevel-wheel on the other end of said shaft an arbor extending out therefrom at right angles to the bed and carriage and at an obtuse angle to the aforesaid shaft, a sleeve surrounding said arbor, fast and loose pulleys upon said sleeve, a friction-wheel and a bevel-pinion also upon said sleeve the bevel-pinion meshing with the aforesaid bevel-wheel, said devices serving for revolving the saw, devices supported by the carriage and bed respectively for progressively feeding along the carriage and the saw, and intermediate devices extending between the latter devices and the friction-wheel on said sleeve for communicating the power of the prime mover to the feeding devices, but which yield under excess tension and strain to check the feed.

11. In a metal-sawing machine, the combination with a bed, a carriage and a saw, of standards upon the carriage, a shaft passing through the same, a sprocket on one end of the shaft, the teeth of which engage apertures in the saw, a bevel-wheel on the other end of said shaft, an arbor secured to one of said standards and extending out therefrom at right angles to the bed and carriage and at an obtuse angle to the aforesaid shaft, a sleeve surrounding said arbor fast and loose pulleys upon said sleeve, a friction-wheel and a bevel-pinion also upon said shaft, the bevel-pinion meshing with the aforesaid bevel-wheel, said devices serving for revolving the saw, devices supported by the carriage and bed respectively for progressively feeding along the carriage and the saw, and intermediate devices extending between the latter devices and the friction-wheel on said sleeve for communicating the power of the prime mover to the feeding devices but which yield under excess tension and strain to check the feed, and regulatable spring devices for normally maintaining the intermediate devices in an initial relation of frictional contact.

Signed at Croton Falls, in the county of Westchester and State of New York, this 24th day of March, A. D. 1903.

CHARLES A. JUENGST.

Witnesses:
  E. T. THOMAS,
  E. LUFF.